United States Patent
Casella et al.

(10) Patent No.: US 11,522,897 B2
(45) Date of Patent: Dec. 6, 2022

(54) DETECTING AND PATCHING NETWORK VULNERABILITIES

(71) Applicant: INTERNATIONAL BUSINESS MACHINES CORPORATION, Armonk, NY (US)

(72) Inventors: Alex Casella, Cambridge, MA (US); Manu Singh, Seattle, WA (US); Grant Covell, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/044,631

(22) Filed: Jul. 25, 2018

(65) Prior Publication Data

US 2020/0036742 A1    Jan. 30, 2020

(51) Int. Cl.
  *H04L 9/40*       (2022.01)
  *H04L 41/0816*    (2022.01)
  *B64C 39/02*      (2006.01)
  *G06F 21/55*      (2013.01)

(52) U.S. Cl.
  CPC ........ *H04L 63/1433* (2013.01); *B64C 39/024* (2013.01); *G06F 21/55* (2013.01); *H04L 41/0816* (2013.01); *H04L 63/205* (2013.01); *B64C 2201/12* (2013.01)

(58) Field of Classification Search
  CPC ............... H04L 63/1433; H04L 63/205; H04L 41/0816; H04L 63/1441; H04L 43/0817; H04L 43/0876; B64C 39/024; B64C 2201/12; G06F 21/55; G06F 2221/2115; G06F 21/577
  See application file for complete search history.

(56) References Cited

U.S. PATENT DOCUMENTS

| | | | |
|---|---|---|---|
| 6,185,619 B1 * | 2/2001 | Joffe | H04L 67/1001 709/225 |
| 8,631,497 B1 | 1/2014 | Oliphant et al. | |
| 9,516,064 B2 | 12/2016 | Lietz et al. | |
| 10,137,984 B1 * | 11/2018 | Flick | B64D 47/00 |

(Continued)

OTHER PUBLICATIONS

Zhen Li et al. "VulDeePecker: A Deep Learning-Based System for Vulnerability Detection," Feb. 2018, pp. 1-15. (Year: 2018).*

(Continued)

*Primary Examiner* — Luu T Pham
*Assistant Examiner* — Canh Le
(74) *Attorney, Agent, or Firm* — Kristofer L. Haggerty (57) ABSTRACT

Embodiments of the present invention disclose a method, a computer program product, and a computer system for a drone-based network vulnerability detection system. According to embodiments of the present invention, a drone receives routes and protocols for detecting and resolving network vulnerabilities. The drone identifies one or more electronic devices connected to one or more networks within an area of interest and detects one or more network vulnerabilities of the one or more electronic devices. If the drone detects a vulnerability, the drone updates a command center and identifies a resolution to the one or more network vulnerabilities. The drone then resolves the one or more network vulnerabilities based on the identified resolution.

11 Claims, 5 Drawing Sheets

(56) References Cited

U.S. PATENT DOCUMENTS

| | | | |
|---|---|---|---|
| 2003/0212779 A1* | 11/2003 | Boyter | H04L 43/50 709/223 |
| 2008/0229419 A1 | 9/2008 | Holostov et al. | |
| 2009/0038015 A1* | 2/2009 | Diamant | G06F 21/57 726/25 |
| 2012/0320736 A1* | 12/2012 | Hillier | H04L 65/1069 370/218 |
| 2014/0096251 A1* | 4/2014 | Doctor | G06F 21/55 726/23 |
| 2014/0101767 A1 | 4/2014 | Cohen et al. | |
| 2014/0181891 A1* | 6/2014 | Von Bokern | H04L 63/0876 726/1 |
| 2014/0207826 A1 | 7/2014 | Gao et al. | |
| 2017/0103213 A1 | 4/2017 | Di Pietro et al. | |
| 2017/0227965 A1* | 8/2017 | Decenzo | H04L 67/125 |
| 2018/0017973 A1* | 1/2018 | Teague | H04W 4/029 |
| 2018/0107820 A1* | 4/2018 | Simakov | G06F 21/577 |
| 2018/0150087 A1* | 5/2018 | Enos | G06Q 10/06311 |
| 2018/0244387 A1* | 8/2018 | Russell | B64C 39/024 |
| 2018/0255084 A1* | 9/2018 | Kotinas | H04L 63/1425 |
| 2019/0003840 A1* | 1/2019 | Song | G01S 19/14 |
| 2019/0159162 A1* | 5/2019 | Hassan | G01S 5/0242 |
| 2019/0172278 A1* | 6/2019 | Castro Duran | G06Q 10/20 |
| 2019/0315482 A1* | 10/2019 | Gu | G05D 1/104 |

OTHER PUBLICATIONS

Antonio Nappa et al., "The attack of the Clones: Astudy of the Impact of Shared Code on Vulnerability Patching," 2015, pp. 692-708. (Year: 2015).*

Koon et al., "SecureCore: A Multicore-based Intrusion Detection Architecture for Real-Time Embedded Systems", 2013 IEEE, pp. 21-31.

Mitchell et al., "A Survey of Intrusion Detection in Wireless Network Applications", journal homepage: www.elsevier.com/locate/comcom. Computer Communications 42 (2014) pp. 1-23.

Kachirski et al., "Intrusion Detection Using Mobile Agents in Wireless Ad Hoc Networks", Proceedings of the IEEE Workshop on Knowledge Media Networking (KMN'02), 2002 IEEE, pp. 1-6.

Mell et al., "The NIST Definition of Cloud Computing", National Institute of Standards and Technology, Special Publication 800-145, Sep. 2011, pp. 1-7.

Monahan, "Wireless Access Point", https://prezi.com/pehcfarkphlh/wireless-access-point/, Prezi, Oct. 23, 2013, pp. 1-3.

* cited by examiner

DETECTING AND PATCHING NETWORK VULNERABILITIES

BACKGROUND

The present invention relates generally to network security, and more particularly to detecting and resolving network vulnerabilities.

Networks allow data to be shared electronically, whether that data be shared across several networks or within the one network, in a timely and efficient manner. Such data access warrants robust network security, however areas such as college campuses, laboratories, factories, and military bases can be very large and have tens of thousands of electronic devices connecting to multiple shared networks. Other places, such as oil rigs and lighthouses, are often isolated/difficult to physically access or maintain networks that are incapable of having vulnerabilities evaluated remotely. Such size and isolation make it difficult to identify cyber security vulnerabilities in these areas, as it is inefficient for cyber security personnel to personally visit these areas to detect and resolve security vulnerabilities.

SUMMARY

Embodiments of the present invention disclose a method, a computer program product, and a computer system for a drone-based network vulnerability detection system.

According to embodiments of the present invention, a drone identifies one or more electronic devices connected to one or more networks within an area of interest and detects one or more network vulnerabilities of the one or more electronic devices. In addition, the drone identifies a resolution to the one or more network vulnerabilities and resolves the one or more network vulnerabilities based on the identified resolution.

Moreover, in accordance with embodiments of the present invention, the drone transmits information regarding the one or more vulnerabilities to a command center. In embodiments, resolving the one or more network vulnerabilities based on the identified resolution further comprises the drone receiving a transmitted resolution to the one or more vulnerabilities from the command center based on the transmitted information and, in further embodiments, the drone storing the transmitted resolution to the one or more vulnerabilities.

According to some embodiments, the drone identifying the one or more electronic devices connected to the one or more networks within the area of interest is performed while navigating a preconfigured route at preconfigured intervals.

Various embodiments of the present invention may further comprise the drone generating a model describing patterns of the identified one or more vulnerabilities and modifying the preconfigured route and the preconfigured intervals based on the model.

Yet further embodiments of the present invention further comprise the drone modifying the preconfigured route and the preconfigured intervals based on one or more triggers, wherein the one or more triggers are selected from a group comprising an electronic device connecting to the one or more networks, a power outage of the one or more networks, resetting of the one or more networks, and updating the one or more networks, and updating the drone.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is focused on the distinctive features or elements of various embodiments of the present invention.

The present invention presents a solution for detecting and patching network vulnerabilities using drones. In the example embodiment, a network vulnerability detection system 100 identifies and resolves network vulnerabilities within an area of interest using one or more drones equipped with network vulnerability detection and resolving tools, as described further herein.

Figure 1:
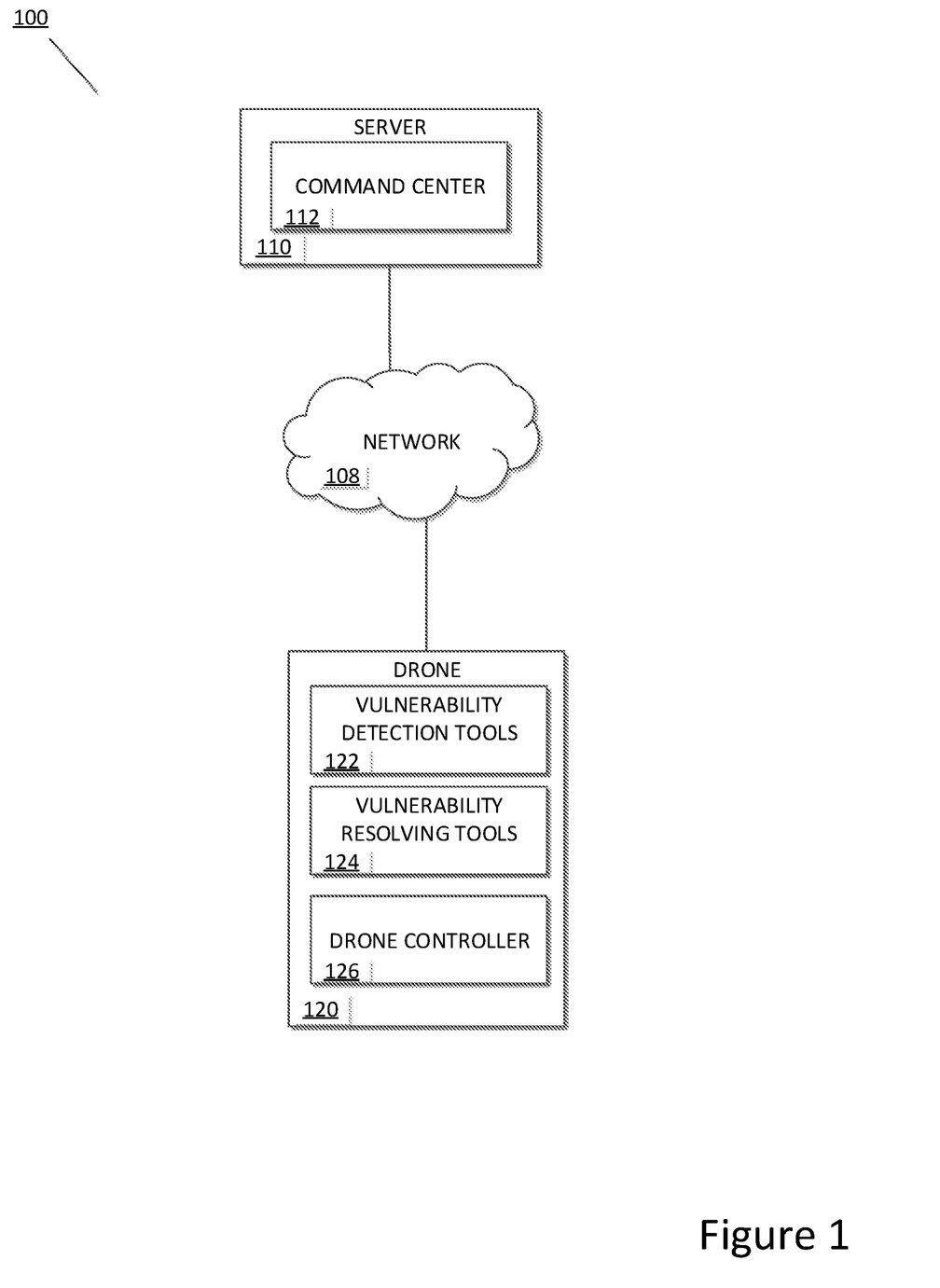
FIG. 1 depicts a schematic diagram of a network vulnerability detection system 100, in accordance with an embodiment of the present invention.

A network vulnerability detection system 100, in accordance with embodiments of the present invention, is illustrated by FIG. 1. In the example embodiment, the network vulnerability detection system 100 includes a server 110 and a drone 120, interconnected via a network 108. While, in the example embodiment, programming and data of the present invention are stored and accessed remotely across multiple servers via the network 108, in other embodiments, programming and data of the present invention may be stored and accessed locally on as few as one physical computing device or, alternatively, amongst other computing devices than those depicted.

In the example embodiment, the network 108 is a communication channel capable of transferring data between connected devices. In the example embodiment, the network 108 may be the Internet, representing a worldwide collection of networks and gateways to support communications between devices connected to the Internet. Moreover, the network 108 may include, for example, wired, wireless, or fiber optic connections which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 can be any combination of connections and protocols that will support communications between the server 110 and the drone 120.

Figure 3:
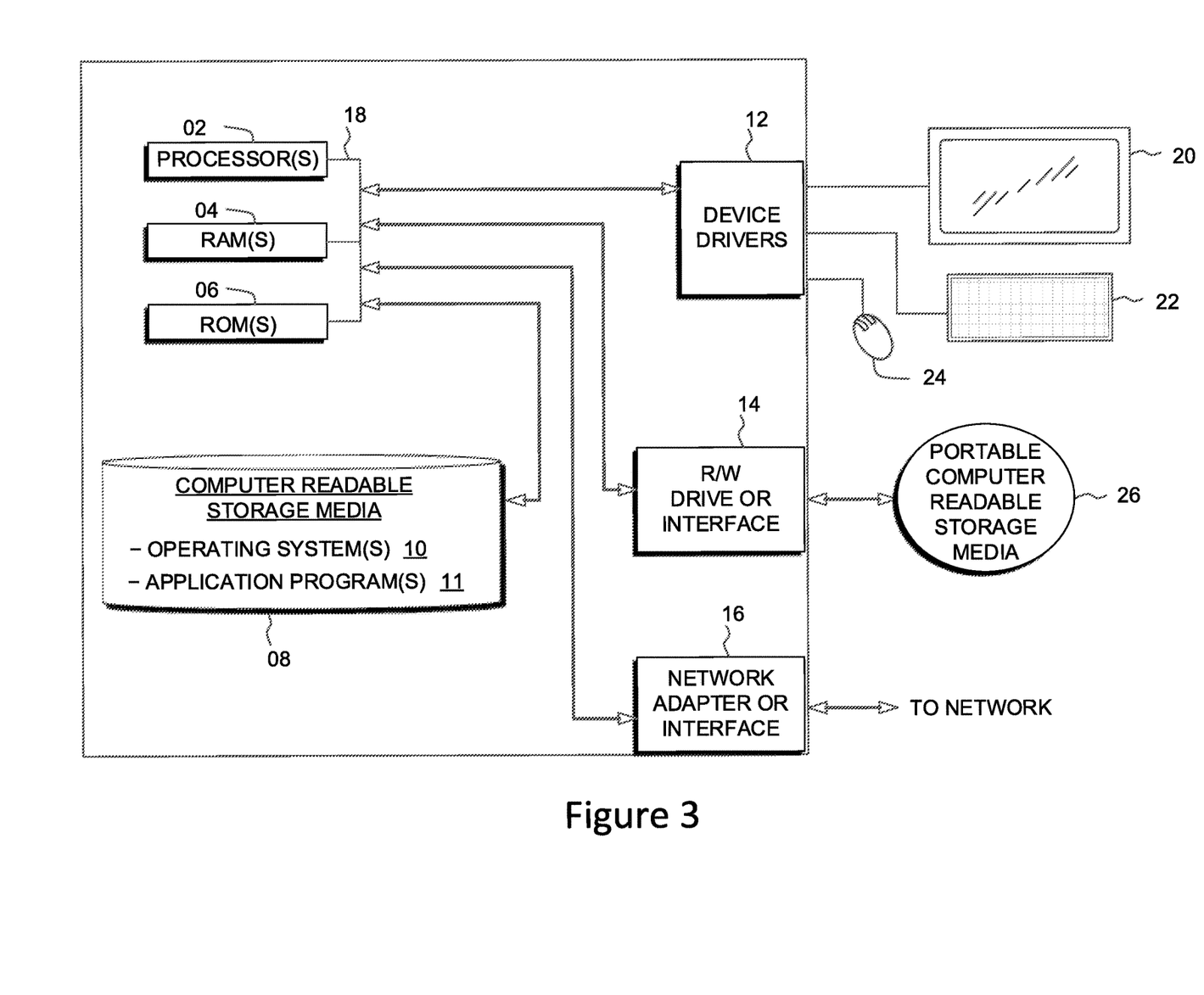
FIG. 3 depicts a block diagram depicting the hardware components of the network vulnerability detection system 100 of FIG. 1, in accordance with an embodiment of the present invention.

In the example embodiment, the server 110 includes a command center 112. The server 110 may be a server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other computing devices. While the server 110 is shown as a single device, in other embodiments, the server 110 may be comprised of a cluster or plurality of computing devices, working together or working separately. The server 110 is described in greater detail with reference to FIG. 3.

The command center 112 is a building, hangar, helipad, facility, checkpoint, or other location from which the drone 120 is controlled, updated, charged, repaired, stored, purged, and the like. In addition to a physical location to store the drone 120, the command center 112 additionally includes computing devices, such as those depicted by FIG. 3, as well as software that enables the command center 112 to communicate with the drone 120. Moreover, the command center 112 may further include security personnel to monitor/direct the drone 120 and maintain security of a location of interest implementing the network vulnerability detection system 100. In various embodiments of the present invention, the command center 112 may house and control one or more of the drone 120, for example a fleet of the drone 120, each responsible for a particular area or subarea of the area of interest, as described in greater detail herein.

The drone 120 includes a vulnerability detection tools 122, a vulnerability resolution tools 124, and a drone controller 126. In the example embodiment, the drone 120 is a device capable of navigating an area of interest, detecting network vulnerabilities, and patching network vulnerabilities. In various embodiments, the network vulnerability detection system 100 includes one or more of the drone 120, which may be dependent on a size of the area of interest and a desired granularity/frequency of vulnerability detection. In such embodiments, one or more of the drone 120 may be collectively referred to hereinafter as "the drones". While, in the example embodiment, the drone 120 is a flying device, in other embodiments, the drone 120 may be any vehicle, including a wheeled vehicle, rail vehicle, vessel, submersible, amphibious vehicle, cable-guided vehicle, zeppelin, hybrid vehicle, and the like. More specifically, and in the example embodiment, the drone 120 is a rotor-based flying device having one or more rotors. In embodiments, the drone 120 may communicate with the command center 112 using wired or wireless communication, and operations of the drone 120 may be controlled via the command center 112, pre-configuration, remote control, or self-guiding, e.g., artificially intelligent or responding to preconfigured triggers. In addition, the drone 120 further includes a computing device, such as that described in greater detail with reference to FIG. 3. In embodiments wherein the drone 120 operates wirelessly, the drone 120 may be further configured to include a wireless adapter and power source, such as a solar panel, battery, etc.

The vulnerability detection tools 122 is a collection of software programming and/or hardware used in detecting and exploiting network vulnerabilities. In the example embodiment, the vulnerability detection tools 122 include a means for detecting common network vulnerabilities, such as open ports, unsecured interfaces, unsecured APIs, and unsecured default administrative user accounts. In addition, the vulnerability detection tools 122 further include a means for implementing exploits known to create network vulnerabilities, such as common access/hacking techniques, distributed denial of service (DDOS) attacks (e.g., through an unsecured API), or unauthorized access through unsecured administrative user accounts. In the example embodiment, the vulnerability detection tools 122 is stored on the drone 120. In other embodiments, however, the vulnerability detection tools 122 may be stored on the server 110 and communicated to the drones wirelessly via the network 108, which may effectively reduce storage and resource consumption of the drones. Moreover, in some embodiments, the vulnerability detection tools may be specific to a particular vulnerability or drones such that a particular drone, e.g., a first drone, is configured to detect particular vulnerabilities while another drone, e.g., a second drone, may be configured to detect different vulnerabilities. In the example embodiment, the vulnerability detection tools 122 are uploaded to the drone 120 by a user/administrator and the vulnerability detection tools 122 may be updated at a periodic basis or as needed through software and firmware updates via wired or wireless communication.

The vulnerability resolution tools 124 is a collection of software programming and/or hardware used in resolving identified network vulnerabilities. In the example embodiment, the vulnerability resolution tools 124 includes tools for running network commands to secure open ports, changing admin user account credentials, discovering publicly identifiable networks, etc. In the example embodiment, the vulnerability resolution tools 124 are preprogrammed to resolve identified vulnerabilities autonomously without the need for human intervention when applicable, however in instances wherein the vulnerability resolution tools 124 does not dictate or otherwise is incapable of resolving an identified vulnerability, the drone 120 is programmed to communicate with the command center 112 in order to find an appropriate resolution. In the example embodiment, the vulnerability resolution tools 124 are uploaded to the drone 120 by a user and the vulnerability resolution tools 124 may be updated regularly or as needed through software and firmware updates via wired or wireless communication.

The drone controller 126 is software program capable of receiving routes and protocols, such as the vulnerability detection tools 122 and the vulnerability resolution tools 124. In addition, the drone controller 126 is further capable of identifying access points in an area of interest and detecting vulnerabilities of the identified access points. Moreover, after identifying a vulnerability, the drone controller 126 is capable of updating the command center 112 with information relevant to the vulnerability. The drone controller 126 is further capable of identifying, or alternatively receiving from the command center, a resolution to the identified vulnerability and applying the resolution to the access point.

Figure 2:
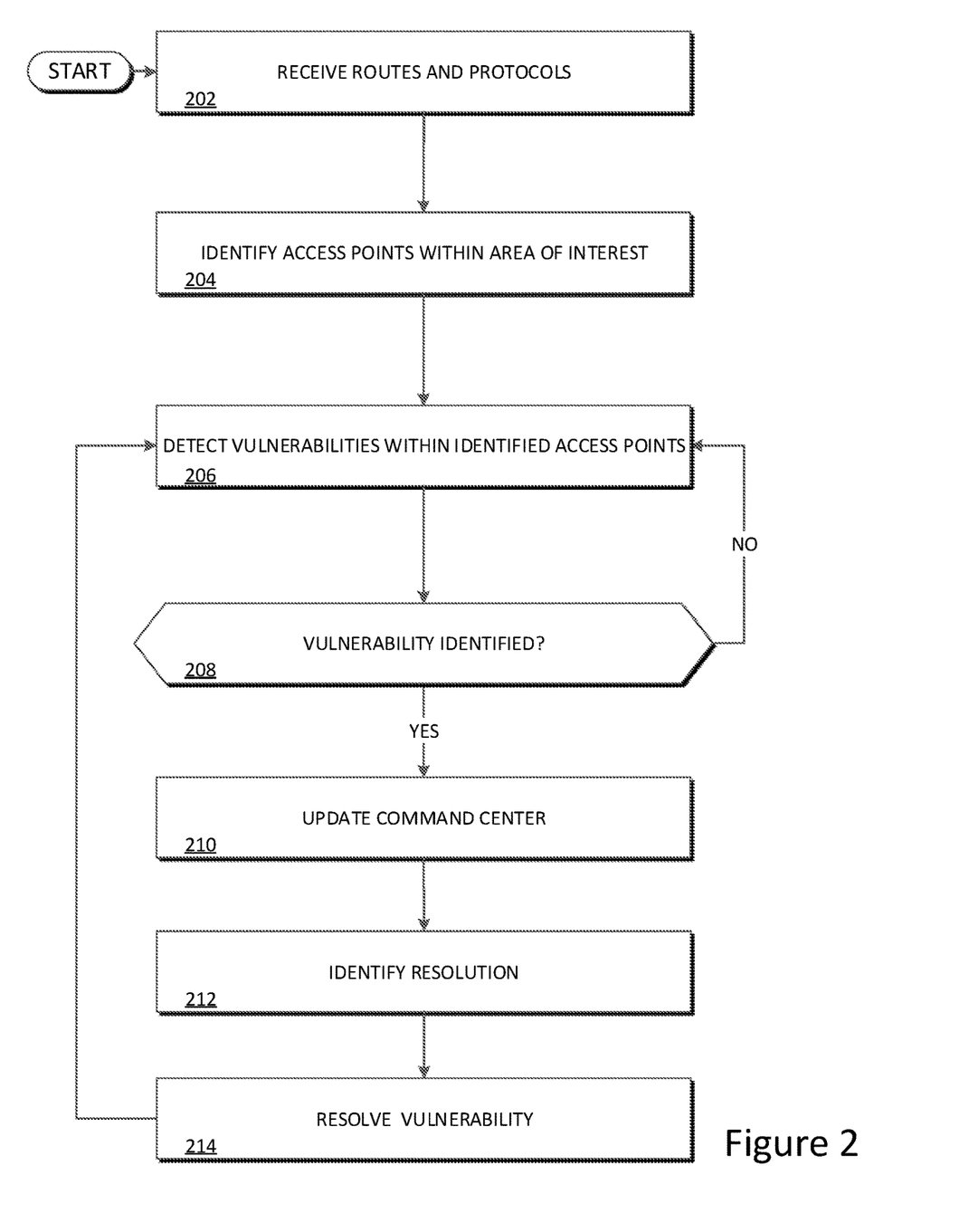
FIG. 2 depicts a flowchart illustrating the operations of a drone controller 126 of the network vulnerability detection system 100 in detecting and patching network vulnerabilities using drones, in accordance with an embodiment of the present invention.

FIG. 2 illustrates the operations of the drone controller 126 of the network vulnerability detection system 100 in detecting and patching network vulnerabilities using drones.

The drone controller 126 receives preprogrammed routes and protocols (step 202). In the example embodiment, the preprogrammed routes are paths that each of the drones are designated to identify vulnerabilities within an area of interest, while the preprogrammed protocols enable the detection and resolution of identified vulnerabilities, which include both the vulnerability detection tools 122 as well as the vulnerability resolution tools 124. In the example embodiment, where programming and protocols of the drones are stored on the drone 120, the drone controller 126 is preloaded or preconfigured with desired routes and protocols for the particular area of interest via user input. In such embodiments, changes to routes and/or protocols may be pushed to the drones wireless via network 108, or uploaded at the command center 112 when the drones are charging, in-between shifts, etc. In other embodiments, where the programming and protocols are stored on the server 110, the preprogrammed routes and protocols may be communicated to the drone 120 in advance or in real time via network 108. In embodiments, each of the drones may be configured to a specific route for a particular section of the area of interest such that the area of interest is patrolled without any overlap between the drones. In other embodiments, routes may overlap and/or the drones may each be configured to scan for vulnerabilities of different types. In further embodiments, the drones may not be preprogrammed with routes, but rather navigate based on user input via remote control through the network 108. In yet further embodiments, the drones may be instead equipped with programming for artificial intelligence such that the drones route themselves according to a particular path, to cover the entire area of interest (for example in randomly generated routes), or in response to specific triggers. Such triggers may include a new device connecting to the network, a power outage, a network reset, a network update, a drone firmware/software update, modified firewall rules, etc. Moreover, the frequency at which the drones patrol the routes, or at which the routes are varied to reduce predictability, may be preconfigured to occur at prescribed intervals (e.g., every hour), at random, and/or in response to particular triggers. Generally, the drones may be configured in any manner to prescribe periodic surveillance of the area of interest in accordance with the intent of a user. In embodiments where the drones operate wirelessly and must be periodically recharged, the network vulnerability detection system 100 may employ drone shifts, backup drones, or configure the drones to recharge at alternating intervals such that, for example, at least one of the drones are active on each route of the area of interest.

With reference to an illustrative example, the drone controller 126 of a first drone is configured to patrol a route around building A while the drone controller 126 of a second drone is configured to patrol a route around building B of a work campus. In addition, the drone controller 126 of the drones are preloaded with protocols for detecting open ports and exploiting vulnerabilities such as administrative network accounts having default credentials.

The drone controller 126 identifies access points within the area of interest (step 204). In the example embodiment, access points within the area of interest are devices and other hardware/software capable of communicating and accessing the network 108, such as computers, smart phones, tablets, watches, smart home devices (light bulbs, switches, speakers, assistants, garage door openers, irrigation controllers, thermostats, etc.), routers, modems, switches, network range extenders, televisions, printers, etc. In the example embodiment, the drone controller 126 identifies access points using network mapping tools. As used herein, network mapping is the study of the physical connectivity of networks and is used to discover the devices on a network as well as their connectivity. In accordance with the example embodiments, network mapping may additionally include identifying device characteristics in addition to the devices themselves, such as operating system, open ports, listening network services, etc. In the example embodiment, the drone controller 126 maps the network 108 using techniques based on the inference of autonomous system connectivity based on border gateway protocol (BGP) control pane data. In other embodiments, however, other networking mapping techniques may be implemented, such as creating a heatmap of WiFi frequencies.

With reference again to the example introduced above, the first drone detects the access points of a router, a PC, a smart phone, a watch, and a tablet at building A.

The drone controller 126 detects vulnerabilities within the identified access points of the area of interest (step 206). Upon detecting an access point within the area of interest, the drone controller 126 uses the vulnerability detection tools 122 to detect vulnerabilities of the access points along a predefined route and, more generally, within the area of interest. Such vulnerability detection tools 122 include software and/or hardware for checking common access point vulnerabilities such as open ports, unsecured interfaces, unsecured APIs, and default administrative credentials. In the example embodiment, the vulnerability detection tools 122 include processes and techniques for detecting and diagnosing problems within a network, for example, using active probing. In addition, the vulnerability detection tools 122 further includes software and hardware for attempting to exploit the access points for potential weaknesses, such as instructions for attempting to log into to a network administrator account using default credentials and instructions to attempt a DDoS attack. In the example embodiment, where the vulnerability detection tools 122 are stored on the drones themselves, the drones may autonomously apply the vulnerability detection tools 122 to the vulnerabilities identified at the access points. In other embodiments, where the vulnerability detection tools 122 are stored on server 110, the command center 112 communicates the vulnerability detection tools 122 to the drones via the network 108.

In the example above, for instance, where the drone controller 126 identifies the access points of a router, a PC, smart phone, a watch, and a tablet, the drone controller 126 detects the vulnerability of an open port on the router and attempts to exploit the router by logging in to an administrative account using the username "admin" and the password "admin".

The drone controller 126 determines whether a vulnerability is detected at one of the identified access points (decision 208). In the example embodiment, the drone controller 126 utilizes the protocols and techniques of the vulnerability detection tools 122 enumerated above in order to detect and exploit vulnerabilities.

If the drone controller 126 fails to detect a vulnerability of one of the identified access points (decision 208 "NO" branch), then the drone controller 126 continues to identify access points within the area of interest in a similar manner to that described above (step 204).

If the drone controller 126 detects a vulnerability of one of the identified access points (decision 208 "YES" branch), then the drone controller 126 transmits updates to the command center 112 via network 108 with information regarding the identified vulnerability (step 210). Such information may include the type of device, the type of vulnerability, a cause of the vulnerability, a particular network/building/location having the vulnerability, a method for exploiting the vulnerability, a duration of the vulnerability, a number of users exploiting the vulnerability, data compromised by the vulnerability, and the like. In the example embodiment, upon receiving the information regarding the vulnerability, the command center 112 records the information for analysis and future reference. In some embodiments, information regarding the vulnerability may be utilized to prevent future vulnerabilities by amending the protocols used by the drone controller 126 via software and firmware updates in real time, at prescribed frequencies/schedules, or in down time. In addition, the drone controller 126 may be programmed to identify patterns within the identified vulnerabilities and modify the drones behaviour based on the identified patterns. For example, if the drone controller 126 determines that installing a new network often times result in an administrative account having default credentials, then the drone controller 126 may evaluate a network immediately rather than on a scheduled basis.

Continuing the illustrative example above where the drone controller 126 of the first drone identifies the access point of a router within the network at building A, the drone controller 126 detects that a server is running OpenSSH 7.0 on port 8080. The drone controller 126 communicates back to the command center 112 the current security-related utilities that are being run on that port as well as the results of attempting to log into an administrative account on the router using default credentials.

The drone controller 126 identifies a resolution for the identified vulnerability (step 212). In some instances of the example embodiment, where the vulnerability resolution tools 124 are stored on the drones themselves, the drone controller 126 may be capable of referencing the vulnerability resolution tools 124 to identify a resolution autonomously and without intervention by the command center 112. In such embodiments, the drones may be programmed with a step by step process for resolving the vulnerability, as well as patches and other software/resources that may be necessary. For example, the drone controller 126 may be configured to apply a patch or change default credentials to random, preconfigured, or device-specific credentials autonomously. In other embodiments, however, the drone controller 126 may not be capable of identifying a resolution to the vulnerability and, accordingly, communicates with the command center 112 to identify a resolution. In such embodiments, identifying the resolution as well as the application thereof may be completed via user input or performed via assistance of the command center 112, for example through use of additional processing power, connections to additional resources/databases, and user/administrator intervention. In some embodiments, the drone controller 126 may apply a process called patch management.

Continuing the illustrative example, the drone controller 126 uses the vulnerability resolution tools 124 to determine that the router access point requires an update to patch the problematic OpenSSH 7.0 on port 8080. The drone controller 126 uploads the necessary file(s) to update the router found within the vulnerability resolution tools 124. In addition, the drone controller 126 identifies alternative credentials to the administrative default credentials of the router.

The drone controller 126 resolves the vulnerability (step 214). In the sample embodiment, the drone controller 126 applies the identified resolution determined in step 214 to the vulnerability via network 108. In further embodiments, where the vulnerability resolution tools are stored on the server 110, the command center 112 may communicate the identified resolution to the access point via the drones or network 108. In yet further embodiments, where the vulnerability resolution tools 124 are located on the server 110, the drones may use a processor and other components described with relation to FIG. 4 to identify a vulnerability and a resolution thereof. In these embodiments, the resolution for vulnerabilities with known and easily applied fixes may be placed on the drones themselves and be applied without having to communicate files from the server 110 to the drones via network 108, aside from status updates as applicable. In other situations, for example where more complex vulnerabilities may need to be resolved, the command center 112 may utilize the update information received from the drones to identify a resolution, including the type of device, the type of vulnerability, a cause of the vulnerability, a particular network/building/location having the vulnerability, a method for exploiting the vulnerability, a duration of the vulnerability, a number of users exploiting the vulnerability, data compromised by the vulnerability, and the like. In these embodiments, the server 110 may process the information and send a resolution to the identified access point to the drone 120 via network 108. In yet further embodiments, where more complex vulnerabilities may need to be resolved, the drones may work in tandem with the command center 112, for example by sending additional resolution suggestions to the command center 112 on server 110. In these further embodiments, the server 110 either approves the suggested resolution and sends such resolution to the drones for application to the access point or the command center 112 may determine a more efficient resolution and send the identified resolution to the access point.

With reference to the earlier introduced example, the drone controller 126 applies the patch to resolve the problematic OpenSSH 7.0 on port 8080 and changes the administrative account credentials to preconfigured credentials for the router.

Figure 4:
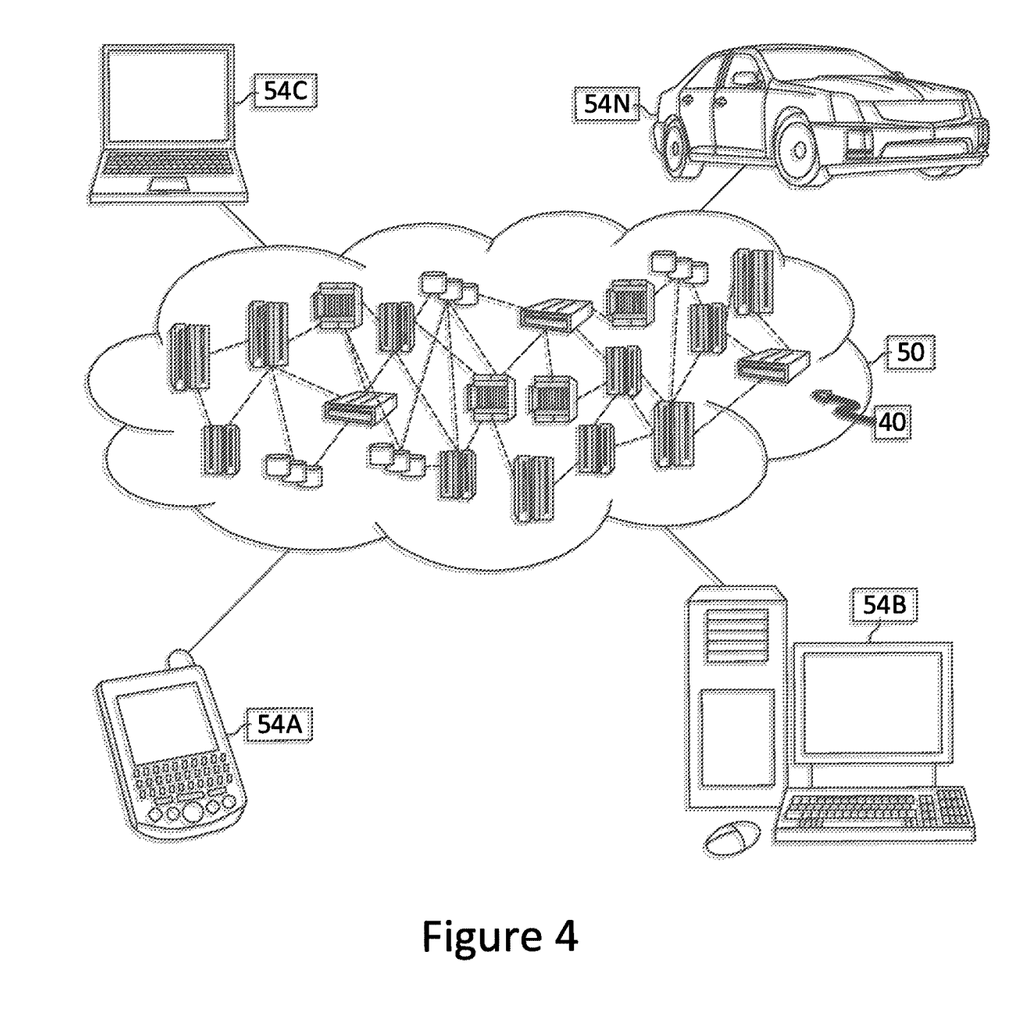
FIG. 4 depicts a cloud computing environment, in accordance with an embodiment of the present invention.

FIG. 4 depicts a block diagram of computing devices of the network vulnerability detection system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

A computing device, for example server 110 or drone 120, may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing devices may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

The computing devices may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

The computing devices may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
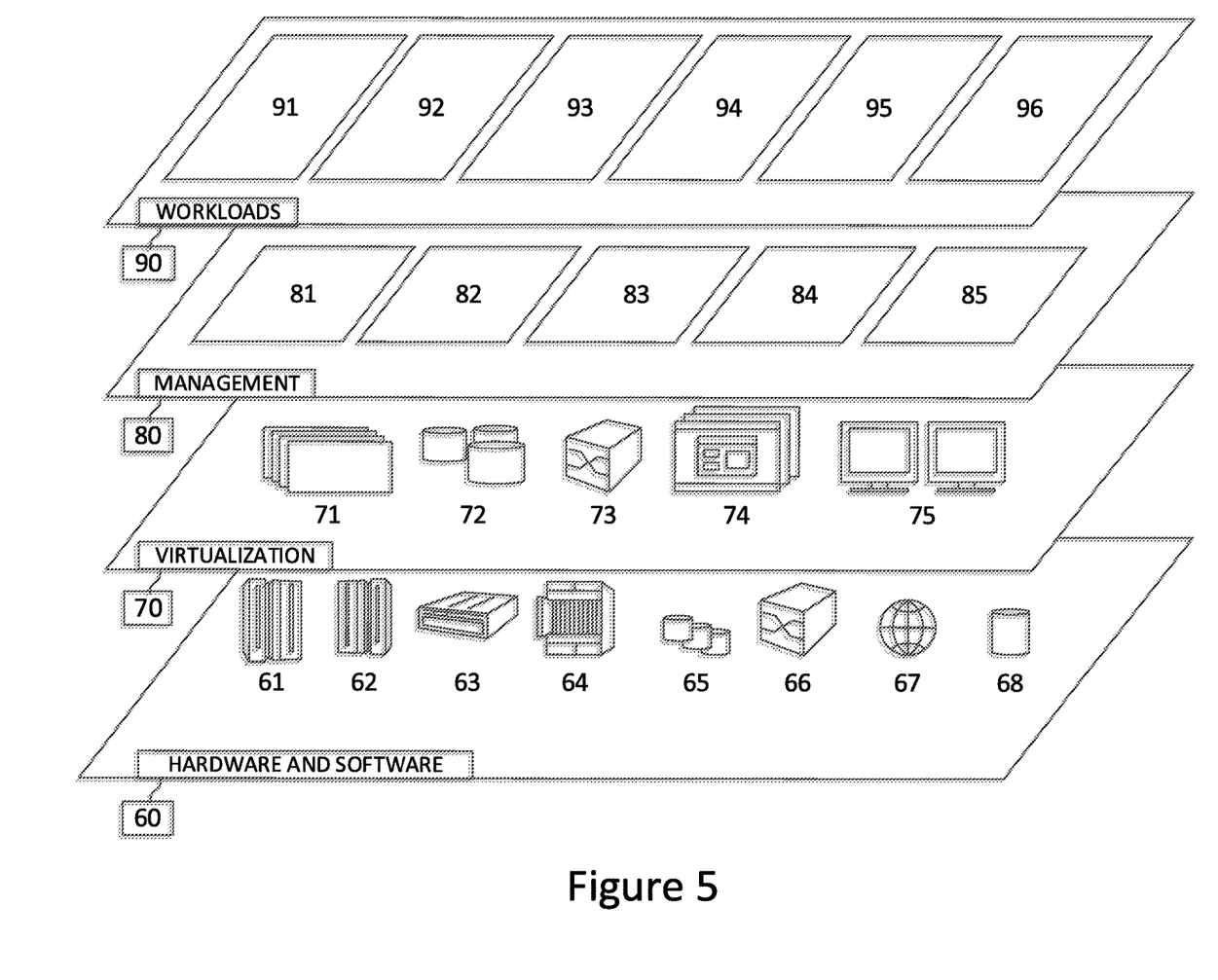
FIG. 5 depicts abstraction model layers, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drone controlling 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for detecting and resolving network vulnerabilities using a drone, the method comprising:
   self-guiding via artificial intelligence a route within an area of interest, wherein the route and a frequency of self-guiding the route are at least one of varied to reduce predictability and based on one or more triggers;
   connecting to one or more networks within the area of interest as the route is self-guided;
   identifying one or more network access points connected to the one or more networks and one or more device characteristics of the one or more network access points via network mapping of border gateway protocol data;
   detecting one or more network vulnerabilities of the one or more network access points via active probing and attempts to exploit the one or more network vulnerabilities using hacking techniques;
   transmitting information regarding the one or more network vulnerabilities to a command center;
   identifying a resolution to the one or more network vulnerabilities, wherein the resolution is received from the command center based on the transmitted information;
   resolving, by the drone, the one or more network vulnerabilities based on the identified resolution;
   generating a model describing patterns of the identified one or more vulnerabilities; and
   modifying the route based on the model.

2. The method of claim 1, further comprising:
   storing the transmitted resolution to the one or more vulnerabilities.

3. The method of claim 1, wherein the one or more network vulnerabilities are selected from a group comprising open ports, unsecured interfaces, unsecured APIs, default administrative user credentials, and publicly accessible networks.

4. The method of claim 1, wherein the one or more triggers are selected from a group comprising an electronic device connecting to the network, a power outage of the network, resetting of the network, updating the network, and updating the drone.

5. A computer program product for detecting and resolving network vulnerabilities using a drone, the computer program product comprising:
one or more non-transitory computer-readable storage media and program instructions stored on the one or more non-transitory computer-readable storage media, the program instructions comprising:
program instructions to self-guide via artificial intelligence a route within an area of interest, wherein the route and a frequency of self-guiding the route are at least one of varied to reduce predictability and based on one or more triggers;
program instructions to connect to one or more networks within the area of interest as the route is self-guided;
program instructions to identify one or more network access points connected to the one or more networks and one or more device characteristics of the one or more network access points via network mapping of border gateway protocol data;
program instructions to detect one or more network vulnerabilities of the one or more network access points via active probing and attempts to exploit the one or more network vulnerabilities using hacking techniques;
program instructions to transmit information regarding the one or more network vulnerabilities to a command center;
program instructions to identify a resolution to the one or more network vulnerabilities, wherein the resolution is received from the command center based on the transmitted information;
program instructions to resolve, by the drone, the one or more network vulnerabilities based on the identified resolution;
program instructions to generate a model describing patterns of the identified one or more vulnerabilities; and
program instructions to modify the route based on the model.

6. The computer program product of claim 5, further comprising:
program instructions to store the transmitted resolution to the one or more vulnerabilities.

7. The computer program product of claim 5, wherein the one or more network vulnerabilities are selected from a group comprising open ports, unsecured interfaces, unsecured APIs, default administrative user credentials, and publicly accessible networks.

8. The computer program product of claim 5, wherein the one or more triggers are selected from a group comprising an electronic device connecting to the network, a power outage of the network, resetting of the network, updating the network, and updating the drone.

9. A computer system for detecting and resolving network vulnerabilities using a drone, the computer system comprising:
one or more computer hardware processors, one or more computer-readable storage media, and program instructions stored on one or more of the computer-readable storage media for execution by at least one of the one or more processors, the program instructions comprising:
program instructions to self-guide via artificial intelligence a route within an area of interest, wherein the route and a frequency of self-guiding the route are at least one of varied to reduce predictability and based on one or more triggers;
program instructions to connect to one or more networks within the area of interest as the route is self-guided;
program instructions to identify one or more network access points connected to the one or more networks and one or more device characteristics of the one or more network access points via network mapping of border gateway protocol data;
program instructions to detect one or more network vulnerabilities of the one or more network access points via active probing and attempts to exploit the one or more network vulnerabilities using hacking techniques;
program instructions to transmit information regarding the one or more network vulnerabilities to a command center;
program instructions to identify a resolution to the one or more network vulnerabilities, wherein the resolution is received from the command center based on the transmitted information;
program instructions to resolve, by the drone, the one or more network vulnerabilities based on the identified resolution;
program instructions to generate a model describing patterns of the identified one or more vulnerabilities; and
program instructions to modify the route based on the model.

10. The computer system of claim 9, wherein the one or more network vulnerabilities are selected from a group comprising open ports, unsecured interfaces, unsecured APIs, default administrative user credentials, and publicly accessible networks.

11. The computer system of claim 9, wherein the one or more triggers are selected from a group comprising an electronic device connecting to the network, a power outage of the network, resetting of the network, updating the network, and updating the drone.

* * * * *